United States Patent Office 3,063,510
Patented Nov. 13, 1962

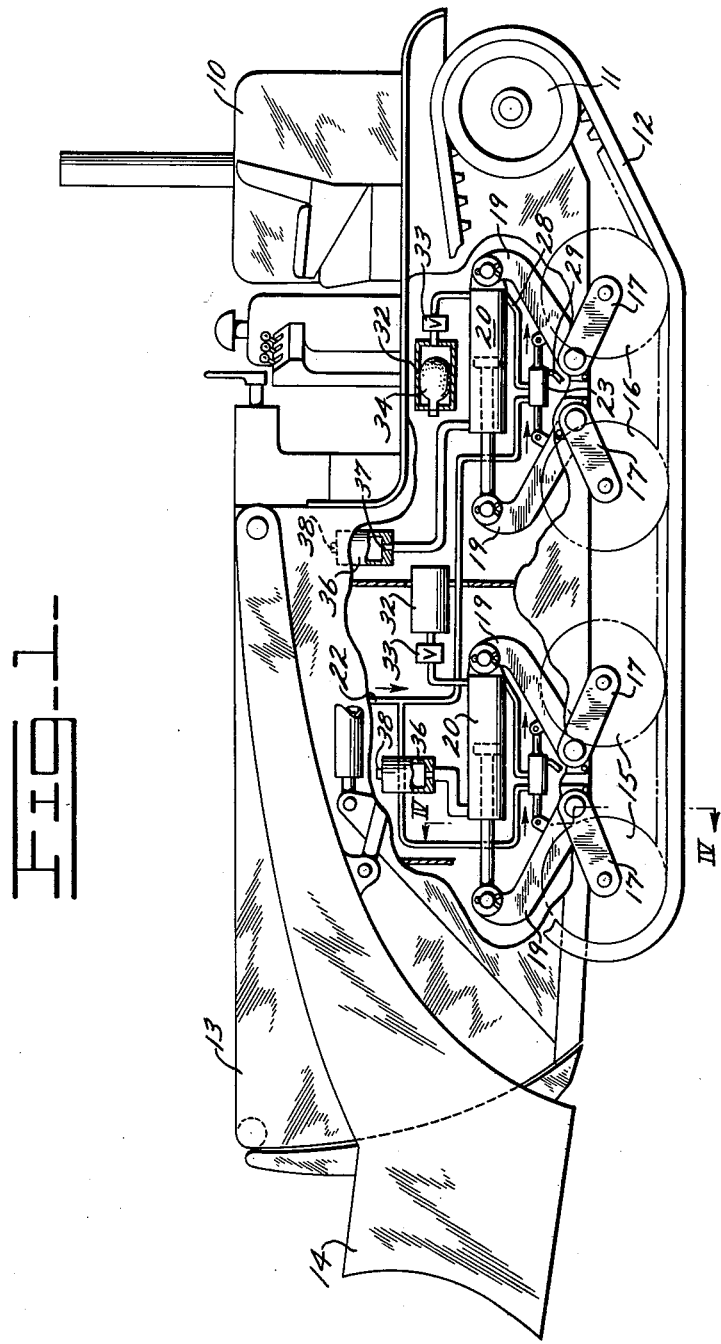

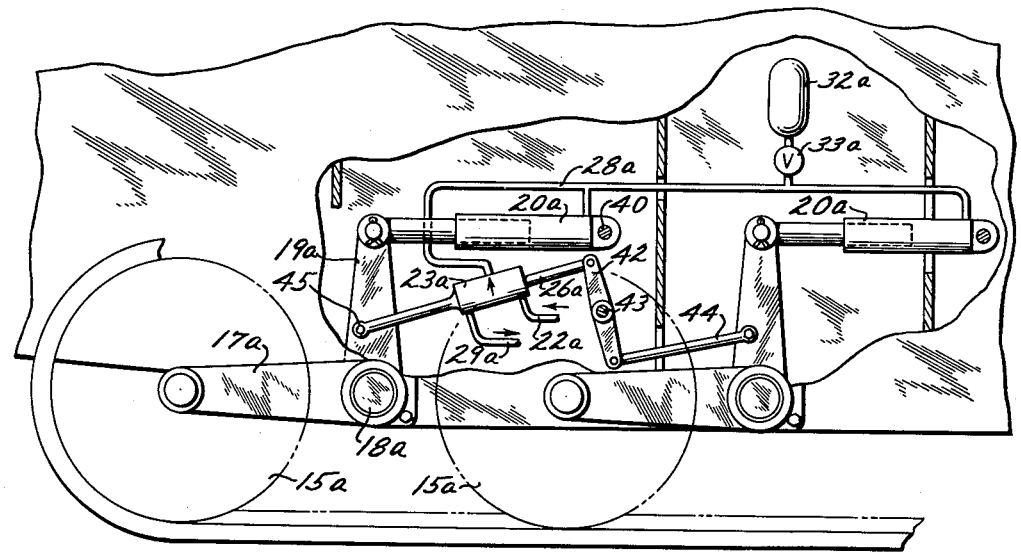
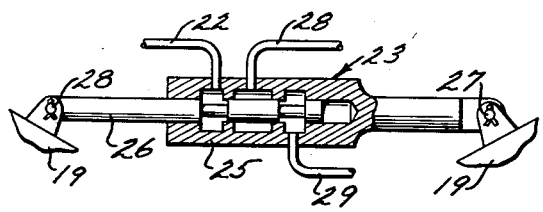
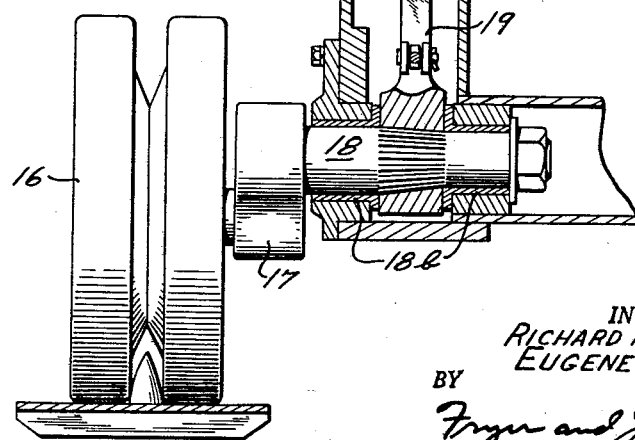

3,063,510
SUSPENSION SYSTEM FOR TRACK-TYPE VEHICLES
Richard H. Hunger, Washington, and Eugene E. Wuigk, Peoria, Ill., assignors to Caterpillar Tractor Co., Peoria, Ill., a corporation of California
Filed July 6, 1959, Ser. No. 825,356
1 Claim. (Cl. 180—9.2)

This invention relates to vehicles suspension systems and particularly to a system having vehicle leveling means and selectively variable resiliency.

Some track-type vehicles, as for example those employed for military use are required to operate for entirely different purposes and under different circumstances. A vehicle traveling at high speed on a relatively smooth road or highway should be resiliently suspended while in the same vehicle during slow operation in rough terrain resilience of suspension is undesirable. Resilience is also undesirable for buildozing operations as well as for scraping and earthmoving operations and pulling heavy loads at low speed. It is desirable too to vary the resiliency of vehicle suspension in proportion to the load being carried. Advantages are also derived from maintaining the body of the vehicle relatively level as it passes over uneven terrain or operates on sloping ground.

It is, therefore, the object of the present invention to provide improved suspension for a track-type vehicle capable of being selectively rendered more or less resilient and self-adjusting to compensate for variations in load, slope and grade and irregularities of terrain.

Further objects and advantages of the invention reside in the construction and arrangement of its various components and will become apparent to an understanding of the following specification in which reference is made to the accompanying drawings.

In the drawings:

FIG. 1 is a view in side elevation with parts broken away and parts in section illustrating a track-type vehicle with a suspension system embodying the present invention;

FIG. 2 is an enlarged fragmentary elevation of a portion of the vehicle such as that shown in FIG. 1 but illustrating a modified form of the invention;

FIG. 3 is an enlarged detail of a leveling valve which forms a part of the vehicle suspension; and FIG. 4 is a section view taken on the line IV—IV of FIG. 1 illustrating certain details of the suspension.

The vehicle illustrated in FIG. 1 is shown as having an engine compartment 10 in which an engine through suitable power transmission mechanism, not shown, is provided to drive a sprocket 11 which drives crawler tracks such as indicated at 12 for propelling a vehicle over the or other material and a bulldozer 14 disposed forwardly has a forwardly disposed bowl 13 for transporting earth surface of the ground. The particular vehicle disclosed of the bowl. Further details of the construction of this vehicle are set forth in our co-pending application entitled "Method and Apparatus for Moving Earth," Serial No. 791,156, filed February 4, 1959, but these details are not necessary to an understanding of the present invention which relates particularly to the suspension system of the vehicle which is adaptable for use on various other types of vehicles as well as the one shown.

The suspension comprises pairs of track or road wheels such as shown at 15 which ride on the endless track 12 supporting the weight of the vehicle as the track is advanced over the ground. FIG. 1 illustrates the suspension system on one side of the vehicle, it being understood that an identical system is employed on the opposite side. The mounting of the wheels in each pair 15 and 16 is also substantially identical. Each wheel is mounted for rotation at the end of a lever 17 which is fixed to a shaft 18 best shown in FIG. 4 suitably journaled in a pair of bearings 18b supported in the hollow side wall and hollow bottom of the bowl 13 which is in effect the body or frame of the tractor. A lever 19 is fixed as by the splined connection illustrated in FIG. 4 to each of the shafts 18 and extends upwardly and outwardly with respect to the pair of wheels with which it is associated so that upon raising or lowering of either of the wheels in a pair, the levers 19 are swung toward or away from each other, respectively, about the centers of the shafts 18 by which they are supported.

This movement of the levers 19 for each pair of wheels is cushioned by a hydraulic cylinder 20, the piston end of which is pivotally connected to one lever at its upper end and the piston rod of which is pivotally connected to the other lever in the pair. The cylinders 20 are charged with hydraulic fluid under pressure originating from a suitable source, not shown, such as a reservoir and pump driven by the engine of the tractor and entering the suspension system under pressure through a line shown at 22. This fluid is directed to each of the cylinders 20 through a leveling valve shown at 23, the function of which is to compensate automatically for differences in load and slope as well as irregularities in terrain encountered by the pair of wheels with which it is associated.

Each leveling valve, the construction of which is shown in detail in FIG. 3, comprises a body 25 with a sliding valve spool 26 therein and the body is pivoted as at 27 to one of the levers 19 while the spool 26 is pivoted as at 28 to the other of the pair of levers. In FIG. 3, the valve is shown in its closed position so that fluid under pressure entering through the line 22 cannot flow to the cylinder 20 through a line 28 communicating therewith nor can fluid from the cylinder be exhausted through the valve and through a line 29 communicating with the reservoir from which the hydraulic fluid is pumped. When any pair of wheels tends to move upwardly relative to the vehicle body as when a heavy load is imposed or a rise in the ground is encountered, the levers 19 approach each other moving a valve spool 26 toward the right as viewed in FIG. 3 opening communication between the lines 22 and 28 and supplying additional fluid to the cylinder 20. On the other hand, a light load on the wheels or any condition permitting them to move downwardly with respect to the vehicle body tends to spread the levers 19 adjusting the spool 26 in the opposite direction and establishing communication between the line 28 and the discharge line 29 to reduce the volume of fluid in the cylinder 20 until a balanced condition again exists.

To afford the resilience of suspension required for high speed travel, an accumulator 32 is connected with the piston end of each cylinder 20 by a line which includes a valve 33. These accumulators are of a conventional commercially available make which comprises a metal enclosure or shell containing a flexible bladder such as shown at 34 charged with a compressible gas. Consequently the shock of impact of the wheels 16 is absorbed by compression of the gas when the hydraulic fluid in the cylinder 20 is forced into the shell of the accumulator 32. When the tractor is engaged in operation where resiliency of suspension is undesirable, the valve 33 may be closed isolating the accumulators and eliminating their resilient effect. It is contemplated that the valves may be actuated simultaneously from a central control means at the operator's station through any suitable linkage not shown.

The resilient action provided by the accumulators 32 may be damped by the use of surge chambers such as shown at 36, one of which is connected with the rod end of each cylinder 20 so that fluid from the rod end of the cylinder is exhausted into the surge chamber when the rod is retracted and withdrawn from the surge chamber when the rod is advanced in the cylinder. A restriction in the line communicating with the surge chamber such for example as shown at 37 may be of a size to provide any degree of damping that is desired. Since the surge chambers are partially filled with air, a vent may be provided as through a fitting 38 in the top of the chamber.

A modified form of the invention is illustrated in FIG. 2 wherein only two of the ground wheels are shown at 15a. In this form of the invention, each individual wheel is mounted on a lever 17a and a shaft 18a which carries a lever 19a corresponding to the parts 17, 18 and 19 in FIG. 1. In this case, a cylinder 20a is connected with each of the levers 19a and to a fixed pivot pin 40 on the vehicle body. A single leveling valve shown at 23a and operating on the same principle as that shown in FIG. 3 is supplied with fluid under pressure through a line 22a has a return line 29a and the line 28a which leads to the piston end of both the cylinders 20a. Since the levers 19a swing in the same direction upon upward movement of either or both of the wheels 15a, the leveling valve cannot be connected directly between them as in the modification of FIG. 1 but its connection includes a reversing link 42 pivoted to the body of the vehicle as at 43 and connecting the spool 26a of the valve with one of the levers 19a through a link 44. The valve itself is connected to the opposite link directly as by a pin 45. A single accumulator shown at 32a is in communication with the piston end of both cylinders 20a and may be isolated from the cylinders as by a valve 33a.

We claim:

In a track-type vehicle having a plurality of track wheels supporting the vehicle body and arranged in pairs, means mounting each pair of wheels for movement in a generally vertical direction with respect to the body, linkage including a hydraulic cylinder for controlling the elevation of the wheels, valve means actuated by such movement of the wheels and controlling a supply of fluid under pressure to and from the cylinder for each pair of wheels tending to maintain the vehicle body level during its movement over irregular terrain, an accumulator chamber containing compressible means communicating with the cylinder to cushion the vertical movement of the wheels, and valve means between the cylinder and accumulator chamber to prevent such cushioning action, said accumulator chamber being in communication with the head end of the cylinder, and a surge chamber in communication with the rod end thereof.

References Cited in the file of this patent

UNITED STATES PATENTS

| | | |
|---|---|---|
| 1,861,866 | Knox | June 7, 1932 |
| 1,930,208 | Marcum | Oct. 10, 1933 |
| 2,025,793 | Tschappat | Dec. 31, 1935 |
| 2,113,545 | Herrington | Apr. 5, 1938 |
| 2,812,954 | Lyon | Nov. 12, 1957 |
| 2,885,202 | Trumper | May 5, 1959 |
| 3,003,781 | Black | Oct. 10, 1961 |

FOREIGN PATENTS

| | | |
|---|---|---|
| 1,153,847 | France | Oct. 14, 1957 |
| 1,166,051 | France | June 9, 1958 |

UNITED STATES PATENT OFFICE
CERTIFICATE OF CORRECTION

Patent No. 3,063,510                              November 13, 1962

Richard H. Hunger et al.

It is hereby certified that error appears in the above numbered patent requiring correction and that the said Letters Patent should read as corrected below.

Column 1, line 47, for "section" read -- sectional --; lines 55 to 57, for "or other material and a bulldozer 14 disposed forwardly has a forwardly disposed bowl 13 for transporting earth surface of the ground. The particular vehicle disclosed" read -- surface of the ground. The particular vehicle disclosed has a forwardly disposed bowl 13 for transporting earth or other material and a bulldozer 14 disposed forwardly --.

Signed and sealed this 14th day of May 1963.

(SEAL)
Attest:

ERNEST W. SWIDER                                  DAVID L. LADD
Attesting Officer                                    Commissioner of Patents